United States Patent [19]

Gilliland

[11] Patent Number: 4,810,276

[45] Date of Patent: Mar. 7, 1989

[54] FORMING OPTICAL FIBER HAVING ABRUPT INDEX CHANGE

[75] Inventor: John W. Gilliland, Horseheads, N.Y.

[73] Assignee: Corning Glass Works, Corning, N.Y.

[21] Appl. No.: 81,755

[22] Filed: Aug. 5, 1987

[51] Int. Cl.$^4$ .................... C03B 37/018; C03C 25/00
[52] U.S. Cl. ........................................ 65/3.12; 65/2; 65/3.11; 65/31; 65/61
[58] Field of Search ..................... 65/2, 3.11, 3.12, 31, 65/61

[56] References Cited

U.S. PATENT DOCUMENTS 4,421,539  12/1983  Edahiro et al. .................. 65/3.12
4,494,968   1/1985  Bhagavatula et al. ........... 65/3.12

Primary Examiner—Robert L. Lindsay
Attorney, Agent, or Firm—William J. Simmons, Jr.

[57] ABSTRACT

A method is disclosed for making a step-index optical fiber having a steep refractive index gradient between core and cladding. Core glass particles comprising a base glass and a refractive index-increasing dopant are deposited on a mandrel. The mandrel is removed and the resultant soot preform is consolidated to form a core preform having a dopant-poor surface region. The core glass preform is stretched and the hole therein is closed to form a core bait rod. Cladding glass soot is deposited on the core bait rod at a density which is at least 0.5 g/cc. This is accomplished by directing the flame from an auxiliary burner onto the core bait rod immediately prior to the deposition of cladding soot thereon. The resultant preform is consolidated and drawn into an optical fiber. In another embodiment, the etched core preform is overclad with a layer of cladding glass, and the composite preform is stretched prior to applying a second overclad layer.

14 Claims, 2 Drawing Sheets

4,810,276

FORMING OPTICAL FIBER HAVING ABRUPT INDEX CHANGE

BACKGROUND OF THE INVENTION

The present invention relates to a method of forming an optical fiber in which there is an abrupt change in refractive index between two adjacent layers.

Fibers having an abrupt change in refractive index between two different layers, e.g. between the core and the next adjacent layer, have been made by the inside vapor deposition (IVD) process. In accordance with the IVD process, reactants flow through a glass substrate tube while a moving hot zone repeatedly traverses the tube in the direction of reactant flow. Glass particles produced in the hot zone travel downstream and deposit on the tube. These particles are consolidated or fused to form a glass layer during each pass of the hot zone. Thus, there is a minimal diffusion of dopant from the core layers to the adjacent cladding layers.

The outside vapor deposition (OVD) process, whereby glass particles, often referred to as soot, are directed laterally or axially onto a starting member, provides a higher deposition rate and larger preform size than the IVD process. A fiber having a core and cladding is usually formed by depositing a cylindrically-shaped preform of core glass particles and cladding glass particles and consolidating that preform to form a draw blank which can be drawn into a fiber. During the consolidation process, dopant from the core portion of the porous preform can migrate through the pores to the cladding portion, thereby creating a dopant-depleted region at the edge of the core and a corresponding dopant-rich region in the adjacent cladding. The resultant core-cladding interface is not sufficiently abrupt for certain applications.

SUMMARY OF THE INVENTION

It is therefore an object of the present invention to provide a method of utilizing the outside vapor deposition process to form optical fibers having abrupt changes in dopant levels and thus abrupt refractive index changes between two adjacent regions.

The method of the present invention comprises forming a glass rod the composition of which includes a base glass and at least one dopant, the concentration of which changes radially from an acceptable level within the rod to an unacceptable level in a surface region of the rod. The rod can be formed, for example, by depositing glass particles on a mandrel, removing the mandrel, and consolidating the resultant porous body to form a non-porous rod. The out-diffusion of dopant during consolidation forms the unacceptable, dopant-poor region. The surface region of the rod is removed, preferably by immersing the rod in an etchant.

After removal of the surface region, a layer of glass is applied to the rod. The composition of this glass layer is different from that of the rod; for example, it could be cladding glass having a refractive index lower than that of the rod. Prior to applying the cladding glass, the rod can be heated and stretched to form an elongated core bait rod. The cladding layer can be applied by depositing a plurality of layers of cladding glass particles on the surface of the core bait rod and heating the resultant assembly to consolidate the cladding glass particles. The density of at least the first layer of cladding glass particles should be at least 0.5 g/cc and is preferably between 0.6 and 0.7 g/cc. The density of the first applied layer of particles can be increased by directing a flame onto the rod immediately prior to depositing that layer.

While the specific embodiment disclosed herein concerns a step index fiber, the present invention can also be employed in the manufacture of other types of optical fibers wherein there exists a sharp refractive index gradient between two adjacent regions.

DESCRIPTION OF THE PREFERRED EMBODIMENTS

Figure 1:
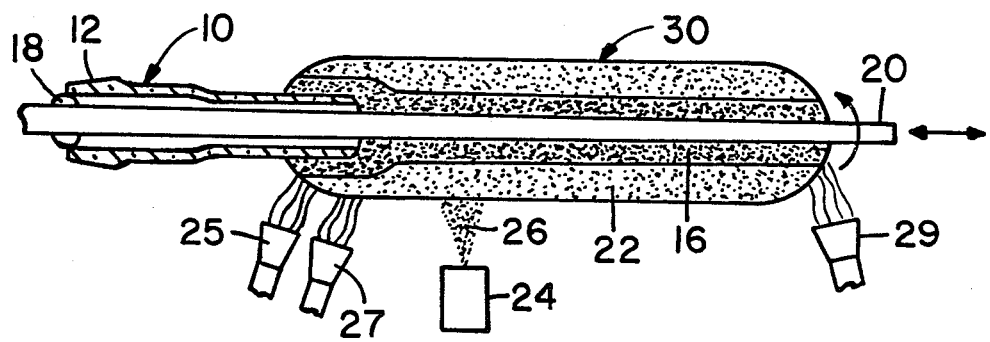
FIG. 1 illustrates the application of successive coatings of glass soot to mandrel.

Apparatus for practicing the OVD process is illustrated in FIG. 1. Handle 10 is a tubular member having a ground glass joint 12 at one end thereof. The large diameter end of a tapered mandrel 20 extends through handle 10 and is secured thereto by shims 18. The ends of the mandrel are mounted in a lathe where it is rotated and translated as indicated by the arrows.

A mixture of fuel gas and oxygen is burned to produce a flame which is emitted from burner 24. A gas-vapor mixture is oxidized within the flame to form glass soot stream 26 which is directed toward mandrel 20. For an illustration of suitable soot-depositing burners, reference is made to U.S. Pat. No. 4,486,212 which shows a burner wherein a centrally located orifice in the burner face is surrounded by three rings of orifices. The reactant compounds emanate from the centrally-located fume orifice where they are subjected to heat from a flame produced by the fuel gas and oxygen emanated from the middle ring of the flame orifices. A stream of oxygen, referred to as the inner shield, emanates from the inner ring of orifices; this stream prevents reaction of the reactant compounds at the burner face. A stream of oxygen referred to as the outer shield emanates from the outer ring of orifices.

Auxiliary burners 25, 27, and 29 are linear ribbon burners which may be employed to direct a flame toward the ends of the soot preform during deposition to prevent breakage. Auxiliary end burners will be described in greater detail in connection with FIG. 4.

To form a conventional step index fiber, burner 24 makes a number of passes with respect to mandrel 20 while the burner generates a stream 26 of soot having a predetermined composition. After a sufficient number of layers has been deposited to build up coating 16 of core soot, the composition of soot stream 26 is changed to one having a lower refractive index. For example, the core glass composition could consist of a base glass such as $SiO_2$ and a refractive index-increasing dopant such as $GeO_2$, $P_2O_5$, $TiO_2$, $Al_2O_3$ or the like. Since germania silicate core glasses provide low loss and high $\Delta$-values, the following discussion will be directed to such glasses. The cladding glass composition could consist of $SiO_2$ or $SiO_2$ doped with one or more dopants capable of providing a doped silica glass having a refractive index lower than that of coating 16. Often flourine or $B_2O_3$ are employed as cladding glass dopants since they lower the refractive index of silica, thereby permitting the use of a lower percentage of refractive index-increasing dopant in the core. When such a depressed refractive index cladding is formed adjacent the core, an outer cladding layer having a refractive index slightly greater than the depressed index clad is often formed radially outwardly from the depressed index clad.

Figure 2:
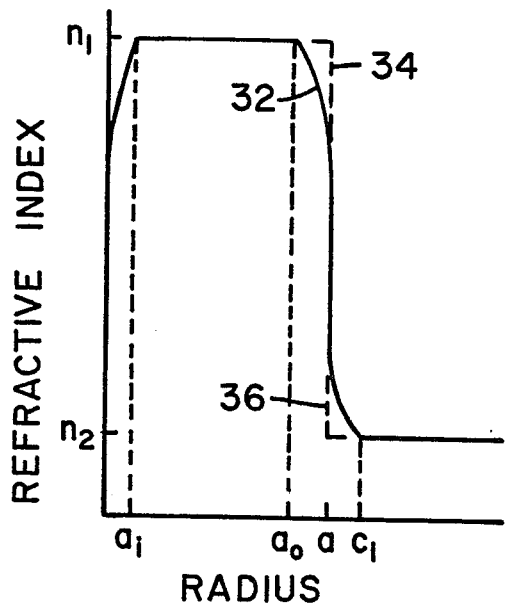
FIG. 2 is a refractive index profile of a step-index optical fiber.

After cladding coating 22 has been built up to a sufficient thickness, the resultant porous glass preform is removed from mandrel 20 and subjected to an elevated temperature to consolidate or fuse the glass particles, thereby forming a nonporous body. During the consolidation process of this conventional method, some of the dopant diffuses from the outer portion of the core coating 16 to the adjacent inner region of cladding coating 22. To some extent this dopant mobility is exacerbated by the use of chlorine for drying the preform, but it occurs even when chlorine is absent from the consolidation atmosphere. When a fiber is drawn from this consolidated blank, the fiber refractive index profile 32, which is shown in FIG. 2, follows a sigmoid distribution between radii $a_o$ and $c_i$ due to the transport of dopant. An ideal step profile at the core-clad interface is represented by dashed lines 34 and 36.

If the porous fiber preform is formed by an OVD process whereby soot is deposited on a temporary bait rod that is later removed, the out-diffusion of dopant from the surface of the hole formed by removing the bait rod reduces the refractive index to values below $n_l$ at radii less than $a_i$. If the porous fiber preform is formed by the axial vapor deposition process, the refractive index profile is free from such a severe centerline dip.

In accordance with the present invention, a porous core preform is deposited and consolidated. The outer portion thereof at radii greater than $a_o$ is removed prior to the step of depositing cladding soot. The amount of core glass to be removed can be determined by analyzing the consolidated core preform by an electron microprobe or by optical means. When many preforms having the same dopant concentration profile are to be made, the dopant profile need not be determined for each of them. Rather, only one or a few of the preforms is analyzed, and it is assumed that the remainder of the preforms have dopant-depleted regions of similar depth.

A preferred method of removing the dopant-depleted region of a high silica content core preform is to immerse that preform in a suitable etchant such as 50% aqueous HF at room temperature. It is convenient, knowing the dimensions and weight of the core preform and the depletion depth, to calculate the weight of glass to be removed. when the weight of the core preform has decreased by the calculated amount, the etching can be stopped. The hole formed by removing the mandrel remains after the core consolidation step. Although the core region up to radius $a_i$ can be removed at the same time that the region between radii $a_o$ and a is removed, the hole-forming surface can be made smoother by flowing a gas phase etchant such as $SF_6$ through the hole. Since the gas phase etchant also etches the inner surface of handle 10, it may be necessary to place a tubular insert in the handle to protect it from the etchant. After the hole has been etched, the end thereof is plugged prior to immersing the core preform into the liquid etchant or other solvent in which the core glass is soluble.

The amount of such depleted glass, and thus the amount of etching that must be done, depends on a number of factors such as the composition of the core glass, the density of the soot prior to consolidation, and consolidation conditions. Furthermore, the depth of a depletion region can be decreased by depositing soot containing more than the required amount of dopant in the region of the soot preform where depletion will occur as taught in U.S. Pat. No. 4,165,223.

Depending upon such factors as the outside diameter of the consolidated and etched core preform and the desired core-clad diameter ratio of the resultant fiber, the core preform may be stretched to decrease its diameter prior to depositing cladding soot thereon. If the core preform is not stretched, handle 10 can remain affixed thereto during the cladding soot deposition process.

Figure 3:
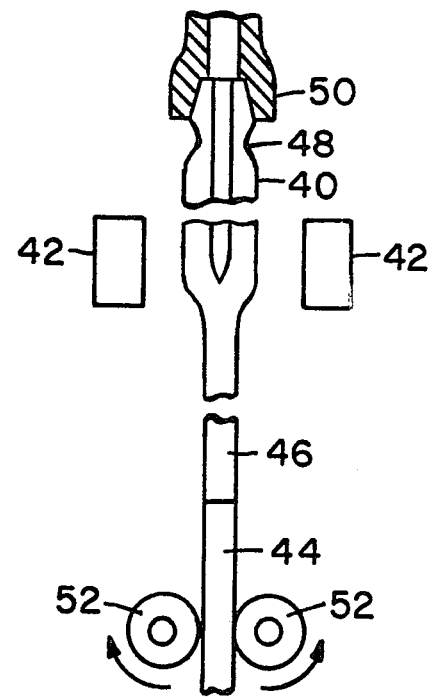
FIG. 3 is a schematic diagram illustrating the stretching of a preform to form a bait rod.

The core preform can be stretched in a conventional draw furnace wherein the tip thereof is heated to a temperature which is slightly lower than the temperature to which the preform would be subjected to draw optical fiber therefrom. A temperature of about 1950°–2000° C. is suitable for a high silica content doped silica preform. A suitable apparatus for forming a stretched core bait rod is illustrated in FIG. 3. wherein core preform 40 is mounted in a draw furnace where the tip thereof is heated by resistance heater 42. A vacuum connection 50 is attached to handle 48, and the preform aperture is evacuated. Motor-driven tractors 52 initially pull a glass rod 44, which is attached to the bottom of preform 40. Eventually, rod 46 is engaged. As the rod is drawn, the aperture readily closes since the pressure therein is low relative to ambient pressure. The diameter of rod 46 is preferably at least 8 mm to prevent warpage thereof during subsequent high temperature processing. The diameter of drawn rod 46 can be measured by a scanning laser beam and an array of light detectors. A feedback signal from the diameter measurement means can be used to control such parameters as the downfeed rate of the preform into heater 42, the temperature of heater 42, and the draw rate of rod 46 by tractors 52.

Rod 46 is severed to form a plurality of core bait rods, each of which is provided with a handle. For example, a silica rod of larger diameter than a bait rod, can be axially fused to the bait rod. The silica handle contains means such as a protrusion or an indentation by which the soot clad bait rod may be suspended in a consolidation furnace.

Figure 4:
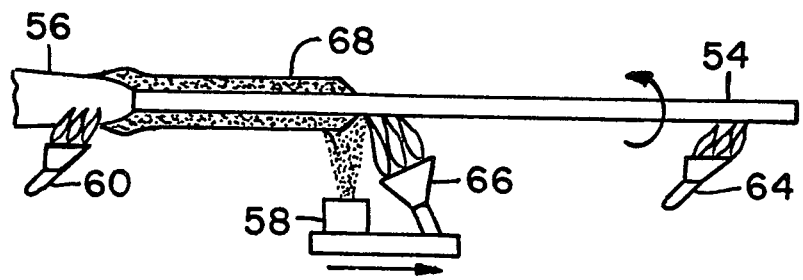
FIG. 4 illustrates an apparatus for overcoating a bait rod.

The apparatus shown in FIG. 4 can be employed to deposit the cladding glass soot. The core glass bait rod 54 is attached to a handle 56 which is used for support purposes in subsequent processing operations. The handle and bait rod are mounted in a lathe whereby they can be rotated and translated with respect to soot-producing flame hydrolysis burner 58 which therefore deposits soot on the bait rod along a helical path. As used in the following examples, the term "burner pass" means the traversing of burner 58 in one direction along rod 54. Another pass occurs when the burner again traverses rod 54 in the opposite direction. Glass soot can be deposited during both passes. Handle end burner 60 directs a flame onto handle 56. The opposite end of bait rod 54 is heated by tailstock end burner 64. At the start of laydown of the cladding soot coating, the end burner flames are relatively low to avoid bait rod bowing. At the end of laydown the flames from burners 60 and 64 are relatively high to keep the end soot very hard to avoid the initiation of cracks which could propagate along the full length of the preform. After about 15 to 20 soot deposition passes of burner 58 along bait rod 54, the end burner flames can be increased to their maximum value. The cladding soot coating shrinks longitudinally as well as radially during consolidation thereof. When cladding soot is deposited on bait rod 54 at a density less than about 0.5 g/cc, the bond of the soot particles to the bait rod surface is not strong enough to force conformity of the bait rod to the soot coating as the coating shrinks longitudinally during consolidation. As a result, the bait rod can project through the upper region of the soot preform as consolidation proceeds. This projection can cause the soot layers adjacent to the bait rod surface to be deformed in a swirl pattern which leaves a void space on either side of the swirl. In a process wherein a 62 cm long bait rod having a diameter of 6 mm was provided with a 3.1 cm thick coating of pure silica soot having a low soot density (about 0.3 g/cc) the bait rod projection was about 4.25 inches, or about equal to the total change in axial dimension of the soot coating during consolidation. At a mean soot density of 0.47 g/cc, the bait rod projection was reduced to about 0.25 inch. Bait rod projection can be completely eliminated by depositing at least the first layer of cladding soot at a density of at least 0.5 g/cc, the remainder of such layers being deposited at the same density or at a density gradually decreasing from the density of the first pass as radius increases. It is preferred that the density of the first soot layer be in the range of about 0.6 to 0.7 g/cc.

To achieve a sufficiently high soot density at the bait/soot coating interface, bait rod 54 must be preheated prior to deposition of the first clad soot coating thereon. Even if the bait rod were preheated by several passes of burner 58 prior to cladding soot deposition, it would be relatively cold on the first pass of cladding soot laydown, thus tending to decrease the density of the initially applied cladding soot. Therefor, an auxiliary burner 66 is used during the deposition of the first layer of cladding soot. Before any soot is deposited on the bait rod, it is advantageous to traverse the flames from burners 58 and 66 along the bait rod without supplying soot-forming reactants to burner 58. During this preheat step, impurities which may have deposited on the surface of the bait rod are volatilized. During the application of the first layer of cladding soot, auxiliary burner 66 traverses the bait rod along with soot deposition burner 58, the flame of burner 66 preferably being contiguous with that of burner 58. The bait rod is thus heated immediately prior to soot deposition. The increase in cladding soot density minimizes preform splitting, prevents interfacial seeds caused by bait rod projection during consolidation, and eliminates laydown-related seeds that form a helical pattern at the corecladding interface.

The heat generated by the auxiliary burner flame may cause the bait rod to bow since the softening point temperature of the dopant-containing core glass is lower than that of silica. This problem can be alleviated by using core bait rods having diameters of 8 mm or greater.

The use of flourine-doped or $B_2O_3$-doped silica cladding soot may be beneficial since it lowers the softening point temperature of the cladding soot, thereby improving soot density. Such soot consolidates at a lower temperature and more readily conforms to surface irregularities on the bait rod. Since such dopants also reduce the refractive index of silica, the dopant content in the core can be correspondingly reduced to achieve the desired core-clad refractive index difference in the fiber. A lower percentage of dopant in the core bait rod increases the softening point temperature thereof with the result that it is more resistant to bowing when subjected to the heat from burners 58, 60, 64, and 66.

Figure 5:
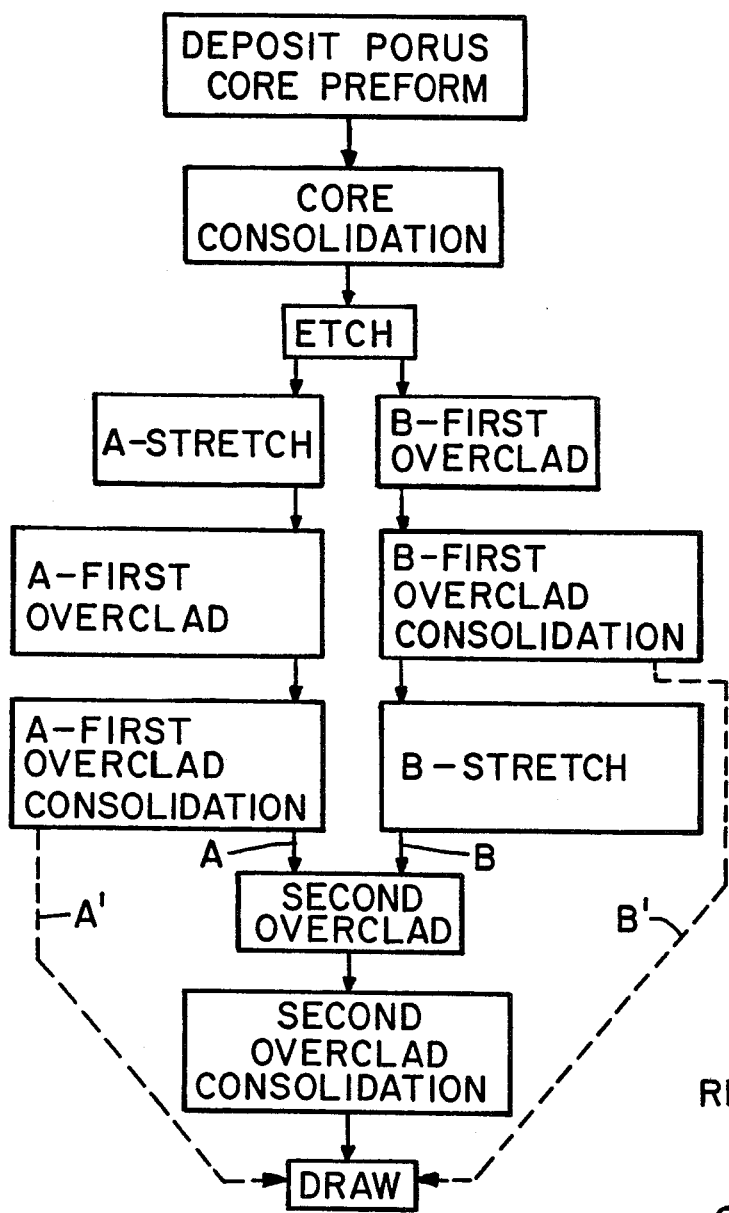
FIG. 5 is a flow chart setting forth a plurality of methods which can be performed in accordance with the present invention.

FIG. 5 is a flow diagram illustrating several fiber-producing processes employing the method of the present invention. The term "first overclad" refers to the deposition of flourine-doped silica to form a depressed index clad whereas "second overclad" refers to the deposition of silica cladding soot containing a lower percentage of flourine. If desired, both overclad compositions could be the same. The most straight forward approach, which is labeled path B', does not involve stretching the consolidated and etched core blank; it merely requires applying a single coating of cladding soot, consolidating the cladding soot and drawing the resulting consolidated preform to form an optical fiber. This may not be a practical method for making fibers having low coreclad diameter ratios. The method of path A' also produces a fiber having a single cladding.

Path A represents the preferred method. The etching process produces some etch pits on the surface of the consolidated core. In the method of path A the etch pits are smoothed by the softening of the glass during the stretch operation, thereby providing a more ideal surface to be coated with cladding soot. However, the high temperature stretching operation results in the reduction of some germania to its volatile monoxide GeO at or near the surface of the stretched core rod. This may result in the formation of interfacial seeds during the fiber drawing step.

The advantage of the method of path B is that the surface of the core rod is passivated with a layer of germania-free silica prior to the time that the core rod is exposed to the high temperature stretching operation. By producing a seed-free interface between the core and cladding before the stretching operation, the tendency for GeO-induced seed production at that interface is greatly reduced. The disadvantage of this method is that the surface of the etched core rod is not an ideal surface to be overclad since it contains etch pits.

Regardless of which specific method is employed, the primary problem is the formation of seeds at the core-cladding interface in the resultant fiber. The point in the process where interface seeds might develop is the high temperature draw operation. However, to produce seeds in the glass at draw temperatures, they must already have been present on at least a microscopic scale prior to the draw operation. The specific methods described herein minimize the production of such microscopic seeds.

The following examples A and B pertain to methods of forming optical fibers in accordance with the processes of paths A and B of FIG. 5. Initially described are steps common to both processes, i.e. the steps of depositing the porous core preform, consolidating that preform, and etching the consolidated preform.

Core Preform Deposition

Figure 6:
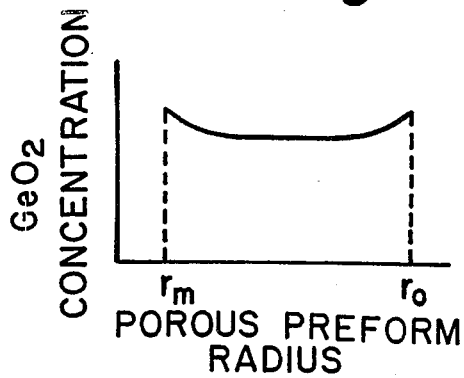
FIG. 6 is a soot preform $GeO_2$ concentration profile.

The core soot preform is formed by the apparatus shown in FIG. 1. The large diameter end of a 107 cm long alumnia mandrel having an outside diameter tapering from 6.4 mm to 4.7 mm is inserted into a hollow integral handle. The mandrel is heated during the first two burner passes prior to glass soot deposition at a burner traverse rate of 2 cm/sec Thereafter, traverse rate is 1.1 cm/sec during glass soot deposition. The flow rate of $GeCl_4$ to the fume line of burner 24 is 0.026 moles/min at the beginning of the run, 0.016 moles/min during the middle of the run and 0.024 moles/min at the end of the run. The flow rate of $SiCl_4$ is 0.114 moles/min at the beginning of the run, 0.123 moles/min during the middle of the run, and 0.116 moles/min at the end of the run. This results in the formation of a porous, $GeO_2$-doped $SiO_2$ soot preform the $GeO_2$ concentration of which is greatest at the inner and outer surfaces, as represented in FIG. 6 where $r_m$ is the mandrel radius and $r_o$ is the preform radius. During the run the natural gas and combustion oxygen fed to burner 24 gradually increase from 6 to 13 l/min and from 5.81 to 13 l/min, respectively, while the outer shield oxygen varies from 4 to 5 l/min. The oxygen flows for inner shield, outer shield and fume line are 2.5 l/min, 5 l/min and 2.5 l/min, respectively. During the first 100 passes the flow of natural gas and oxygen to the joint end burner varies from 1.235 l/min to 1.805 l/min and from 0.95 l/min to 1.425 l/min, respectively and they remain constant during the remainder of the run. The flow rates of natural gas and oxygen to left end burner 25 increase from 1.0 l/min and 0.8 l/min, respectively, to 1.8 l/min and 1.5 l/min, respectively. The flow rates of natural gas and oxygen to right end burner 29 increase from 0.6 l/min and 0.4 l/min, respectively, to 1.3 l/min and 1.0 l/min, respectively, at pass number 50. A total of 500 passes may be employed to form the core preform.

Core Consolidation

The mandrel is removed and the tubular core soot preform is inserted at a rate of 0.4 cm/min into a consolidation furnace having a maximum temperature of 1400° C. Helium, chlorine and oxygen flow through the handle and into the preform aperture at 2 l/min, 50 cc/min and 75 cc/min, respectively. Helium flows upwardly through the furnace muffle at a rate of 20 l/min. The consolidation process results in dopant depleted regions at the inner and outer surfaces of the resultant preform so that the refractive index profiles of the inner and outer regions of the consolidated preform are similar to those regions of FIG. 2 up to radius $a_i$ and between radii $a_o$ and $c_i$.

Etch

Each core preform can be analyzed to determine the depths of the inner and outer dopant-depleted regions. If a plurality of similar preforms is being made, only the first needs to be analyzed. If the depth of the inner dopant-depleted region is known before the porous preform is consolidated, the inner region can be removed by gasphase etching before it is removed from the consolidation furnace.

To remove the inner dopant-depleted region in the aforementioned consolidated preform, the following process is employed. After the consolidated core preform is withdrawn to the entry port of the consolidation furnace, helium, oxygen and $SF_6$ are flowed through the handle and preform aperture at 350 cc/min, 110 cc/min and 75 cc/min, respectively. The core preform again traverses the hot zone of the furnace at a downfeed rate of 0.5 cm/min during which time the central $GeO_2$-poor region is removed by the gas phase etchant $SF_6$.

The thickness of the outer, dopant-depleted region in core preforms formed in accordance with the method of this example is typically about 5 mm. In a core preform having a radius of about 25 mm and weighting about 1700 g, the dopant-depleted region weighs about 600 g. The core preform is therefore subjected to an etch treatment designed to remove that predetermined amount of glass.

Figure 7:
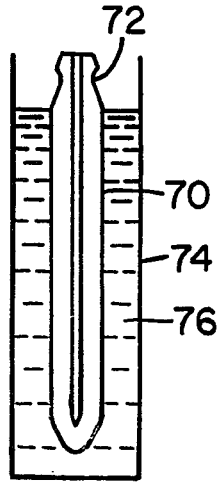
FIG. 7 illustrates the etching step of the present invention.

Referring to FIG. 7, the tip of consolidated preform 70 opposite handle 72 is flameworked to seal the aperture. Cylindrical vessel 74 is sufficiently deep that the entire core preform 70 can be submersed in acid, and the diameter of vessel 74 is such that a spacing of at least 1 cm exists between preform 70 and vessel 74. The vessel contains 50% hydroflouric acid 76 maintained at room temperature (about 20°–25° C.) After about 24 hours of treatment in acid 76, the perform is withdrawn and weighed. Thereafter, the preform is periodically weighted until the predetermined final weight of 1100 g is reached. About 48 hours is required to etch 600 g from the preform which is then rinsed in deionized water and dried.

EXAMPLE A

A-Stretch

The etched, consolidated core preform is inserted into a furnace having a zirconia muffle, the peak temperature of which is maintained about 1950° C. The preform downfeed rate is about 7.5 mm/min. Draw tension is about 10 inch-pounds and the draw rate is about 28 mm/min to draw a 10 mm diameter rod.

A-First Overclad

A 62 cm long piece of core bait rod is severed from the drawn rod, and a formed silica handle is axially fused thereto. The bait rod is mounted in a deposition apparatus of the type shown in FIG. 4, and a coating of $SiO_2$ soot is applied to the core bait rod in accordance with the following.

Prior to soot deposition, natural gas and oxygen are fed to auxiliary burner 66 at 4.1 l/min and 4.7 l/min, respectively. The gas and oxygen flows to burner 58 during the bait rod preheating process are 4 l/min and 3 l/min, respectively (premixed) to the flame orifices, 1 l/min inner shield oxygen, 0.5 l/min outer shield oxygen and 1 l/min fume line oxygen. Burners 58 and 66 make four passes along the bait rod during this preheating process.

During soot deposition, the above-mentioned flows to burner 66 continue during the first burner pass, after which time they cease. During soot deposition the bait rod traverses flame hydrolysis burner 58 about thirty times until the required about of soot has been applied. The flow rate of $SiCl_4$ to burner 58 increases linearly from 0.07 to 0.077 moles/min between passes 1 and 25 and then remains constant. During the first 25 passes, the natural gas flow varies between 6.65 and 9.20 l/min, and the combustion oxygen flow varies between 5.88 and 8.14 l/min, these flow then remaining constant. The flow of oxygen to both the inner shield orifices and the fume line vary from 2.5 to 2.75 l/min and then remain constant. Outer shield oxygen flows at a rate of 5.0 l/min throughout the run.

During the first 16 burner passes, the flow rate of natural gas to left end burner 60 and right end burner 64 is 1.1 and 0.75 l/min, respectively, and the flow rate of oxygen to those burners is 0.9 and 0.6 l/min, respectively. For the remainder of the run, the flow rate of natural gas to burners 60 and 64 is 1.5 and 1.1 l/min, respectively, and the flow rate of oxygen to those burners is 1.2 and 0.8 l/min, respectively. The burner traverse rate is 0.3 cm/sec, and the bait rod rotation rate is 2.5 rps. The soot deposition process is computer controlled, and the weight of the bait rod and deposited $SiO_2$ soot is monitored by an on-line weigher. When the weight of the applied soot reaches about 60 g, the run is terminated.

A-First Overclad Consolidation

The overclad preform is inserted at a rate of 0.4 cm/min into a consolidation furnace, the maximum temperature of which is 1400° C. During the consolidation process, the following gases flow through the muffle: helium at 20 l/min, chlorine at 200 cc/min and $SiF_4$ at about 3 l/min. The consolidated soot contains $SiO_2$ doped with about 0.4–0.5 wt. % F.

Second Overclad

A layer of $SiO_2$ soot doped with 0.2–0.3 wt. % F is deposited on the resultant overclad preform in a lathe of the type shown in FIG. 4. Burners 58 and 66 make four passes with respect to the overclad preform to preheat it prior to soot deposition under conditions as described under the heading "A-First Overclad". Burner 66 is turned off after the first pass of soot deposition. During this second overclad process, the $SiCl_4$ flow rate and the flows of natural gas and oxygen to end burners 60 and 64 are the same as in the above-described "A-First Overclad" process. The second overclad process requires 98 burner passes during which time the flow rates to burner 58 are 0.3 l/min $C_2F_6$, 7.0 l/min natural gas, 6.19 l/min combustion oxygen, 2.5 l/min inner shield oxygen, 5.0 l/min outer shield oxygen and 2.5 l/min fume line oxygen.

Second Overclad Consolidation

The resultant preform is consolidated under conditions similar to the above-described "A-First Overclad Consolidation" process except that no $SiF_4$ is employed. The composition of the resultant outer cladding layer is $SiO_2$ doped with 0.2–0.3 wt. % F.

Draw

The resultant consolidated preform is mounted in a draw furnace where the bottom tip thereof is heated to 2100° C. An optical fiber having a diameter of 125 μm is drawn at a speed of about 1.25 m/sec.

EXAMPLE B

A core preform is deposited, consolidated and etched as described above in Example A.

B-First Overclad

The etched core preform is mounted in a deposition apparatus of the type shown in FIG. 4. Natural gas and oxygen are fed to burner 66 at rates of 4.1 l/min and 4.7 l/min during the first 20 burner passes to heat the core bait rod. Burner traverse rate is 3.0 cm/sec and bait rod rotation rate is 2.5 rps during the bait rod preheat step. At pass No. 21 burner traverse rate decreases to 0.3 cm/sec. The flow rates of gases and reactants to burner 58 are 9.2 l/min combustion natural gas, 9.2 l/min combustion oxygen, 2.5 l/min inner shield oxygen, 5.0 l/min outer shield oxygen and 2.5 l/min fume line oxygen. The sootproducing reactants are $SiCl_4$ and $C_2F_6$. The flow rate of $SiCl_4$ to burner 58 varies linearly from 0.07 moles/min at pass No. 21 to 0.077 moles/min at pass No. 45 after which it remains constant. The flow of $C_2F_6$ remains constant at 0.3 l/min. The flow rates of natural gas and oxygen to end burners 60 and 64 are the same as for the "A-First Overclad" process. A total of 90 burner passes are made.

B-First Overclad Consolidation and B-Stretch

These processes are the same as the "A-First Overclad Consolidation" and "A-Stretch" processes.

The resultant preform is subjected to the "Second Overclad", "Second Overclad Consolidation" and "Draw" processes described in Example A.

Results

Figure 8:
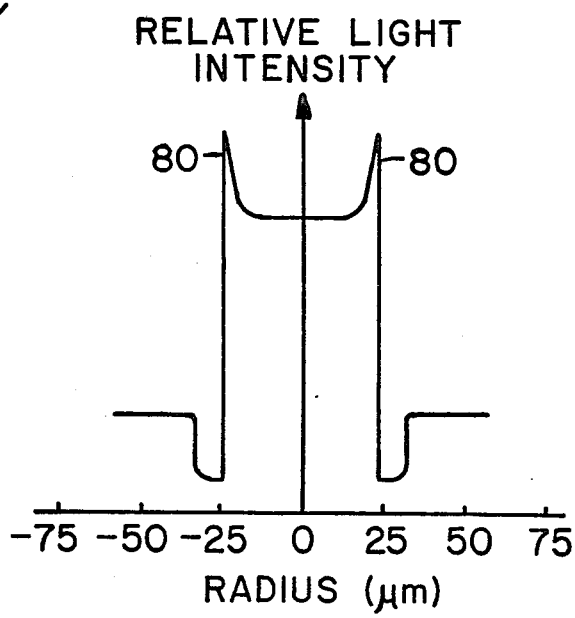
FIG. 8 is a refracted near field profile of an optical fiber produced in accordance with the present invention.

Fibers produced by the methods of Examples A and B exhibited attenuations less than 0.9 dB/km at 1300 nm. A typical refracted near field profile for these two methods is shown in FIG. 8. The core diameter is 50 μm, the depressed clad diameter is 60 μm, and the outside diameter is 125 μum. Ears 80 at the core-cladding interface are indicative of the abrupt change in refractive index at that interface and do not represent the true refractive index profile of the fiber. Draw blanks produced in accordance with Examples A and B were each capable of producing a total of 12 km of optical fiber. The number of seeds per preform could be kept relatively low so that relatively long lengths of seed-free fibers could be drawn. Typically 5–10 optical fibers having lengths greater than 1.0 km could be drawn from each preform. The longest fibers produced by the methods of Examples A and B are 10 km and 3.1 km, respectively.

I claim:

1. A method of making an optical fiber preform comprising
   forming a glass rod the composition of which includes a base glass and at least one dopant, the concentration of said dopant changing radially from an acceptable level within said rod to an unacceptable level in a surface layer of said rod,
   immersing said rod in an etchant to remove said surface layer, the step of etching being sufficiently severe that it results in the formation of etch pits in the surface of said rod,
   heating and stretching said rod to smooth said etch pits and provide a better surface on which to deposit cladding soot, the step of stretching resulting in the formation of an elongated core bait rod, and thereafter
   applying to said rod a layer of glass having a composition different from that of said rod by depositing a plurality of layers of particles of glass on said elongated core bait rod and heating the resultant assembly to consolidate said glass particles and form said layer of glass.

2. A method of making an optical fiber preform comprising forming a glass rod the composition of which includes a base glass and at least one dopant, the concentration of said dopant changing radially from an acceptable level within said rod to an unacceptable level in a surface layer of said rod, removing said surface layer, applying to said rod a layer of glass having a composition different from that of said rod, said layer of glass being free from said dopant, whereby the surface of the composite body formed of said rod and said layer is also free from said dopant, heating and stretching said composite body to form a bait rod of reduced diameter, and applying a second layer of glass to said reduced diameter bait rod.

3. A method of making an optical fiber preform comprising forming a glass rod the composition of which includes a base glass and at least one dopant, the concentration of said dopant changing radially from an acceptable level within said rod to an unacceptable level in a surface layer of said rod, immersing said glass rod in an etchant to remove said surface layer, and thereafter depositing a plurality of layers of particles of glass on said etched rod, at least the first of said layers of glass particles being deposited with a density of at least 0.5 g/cc, and heating the resultant assembly to consoldiate said glass particles.

4. A method in accordance with claim 1 wherein the step of depositing comprises depositing at least the first of said layers of glass particles with a density of at least 0.5 g/cc.

5. A method in accordance with claim 4 wherein the step of depositing comprises directing a heating flame onto the surface of said bait rod immediately preceding the application of the first layer of glass particles thereto.

6. A method in accordance with claim 4 wherein the step of depositing comprises directing onto the surface of said bait rod a flame hydrolysis burner flame containing said glass particles, and directing a heating flame onto the surface of said bait rod immediately preceding the application of the first layer of glass particles thereto, said flame hydrolysis burner flame being contiguous with said heating flame.

7. A method in accordance with claim 1 wherein the step of applying a layer of glass comprises applying a plurality of layers of particles of glass on said elongated core bait rod and heating the resultant assembly to consolidate said glass particles and form said layer of glass, said glass particles being formed of a base glass and a dopant which lowers the softening point thereof so that, during the step of heating to consolidate said glass particles, said particles flow and fill in surface imperfections in said core bait rod.

8. A method in accordance with claim 3 wherein the step of depositing comprises directing a heating flame onto the surface of said bait rod immediately preceding the application of the first layer of glass particles thereto.

9. A method in accordance with claim 3 wherein the step of depositing comprises directing onto the surface of said bait rod a flame hydrolysis burner flame containing said glass particles, and directing a heating flame onto the surface of said bait rod immediately preceding the application of the first layer of glass particles thereto, said flame hydrolysis burner flame being contiguous with said heating flame.

10. A method of making a step-index optical fiber preform having an abrupt refractive index change between the core and adjacent cladding, said method comprising forming a porous glass preform comprising a base glass and a dopant which increases the refractive index of said base glass, heating said porous preform to a temperature that is sufficiently high that it consolidates to a non-porous preform, the out-diffusion of dopant during said consolidation step resulting in a dopant-poor region that extends into said consolidated core preform a given distance from the surface thereof, removing said dopant-poor region, and applying cladding glass to the resultant consolidated core preform by depositing a plurality of layers of cladding glass particles on said consolidated core preform, a flame being directed onto the surface of said core preform immediately preceding the application of the first layer of glass particles thereto, at least the first layer of cladding glass particles having a density of at least 0.6 g/cc.

11. A method of making an optical fiber preform comprising forming a porous glass preform comprising a base glass and a dopant which increases the refractive index of said base glass, heating said porous preform to a temperature that is sufficiently high that it consolidates to a non-porous preform, the out-diffusion of dopant during said consolidation step resulting in a dopant-poor region that extends into said consolidated core preform a given distance from the surface thereof, immersing non-porous preform in an etchant to remove said dopant-poor region, heating said non-porous preform and applying tensile force thereto to form an elongated core bait rod, depositing a plurality of layers of cladding glass particles on said elongated core bait rod, at least the first layer of particles having a density of at least 0.5 g/cc, and heating the resultant assembly to consolidate said cladding glass particles.

12. A method in accordance with claim 11 wherein the step of depositing a plurality of layers of cladding glass particles comprises locally heating said elongated core bait rod immediately prior to the deposition of cladding glass particles thereon.

13. A method in accordance with claim 11 wherein the step of depositing a plurality of layers of cladding particles comprises rotating and longitudinally traversing said elongated core bait rod with respect to a stream of cladding glass particles so that said particles deposit on said bait rod along a helical path and directing a flame toward said bait rod in a region adjacent to that region wherein said stream of particles contacts said bait rod.

14. A method in accordance with claim 11 wherein, prior to the step of heating and stretching said consolidated core preform, a plurality of layers of cladding glass particles is deposited on the surface of said consolidated core preform and the resultant composite body is subjected to a temperature sufficiently high to consolidate said particles.

* * * * *